US012335562B2

(12) United States Patent
Channapragada et al.

(10) Patent No.: US 12,335,562 B2
(45) Date of Patent: *Jun. 17, 2025

(54) SYSTEMS AND METHODS FOR HANDLING AUDIO DISRUPTIONS

(71) Applicant: Adeia Guides Inc., San Jose, CA (US)

(72) Inventors: Srikanth Channapragada, Bangalore (IN); Vikram Makam Gupta, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/080,250

(22) Filed: Dec. 13, 2022

(65) Prior Publication Data
US 2023/0308715 A1 Sep. 28, 2023

Related U.S. Application Data

(63) Continuation of application No. 17/086,743, filed on Nov. 2, 2020, now Pat. No. 11,558,658.

(51) Int. Cl.
H04N 21/439 (2011.01)
H04N 21/422 (2011.01)
H04N 21/442 (2011.01)
H04N 21/845 (2011.01)

(52) U.S. Cl.
CPC ... *H04N 21/4394* (2013.01); *H04N 21/42203* (2013.01); *H04N 21/4396* (2013.01); *H04N 21/44213* (2013.01); *H04N 21/845* (2013.01)

(58) Field of Classification Search
CPC ......... H04N 21/4394; H04N 21/42203; H04N 21/4396; H04N 21/44213; H04N 21/845
See application file for complete search history.

(56) References Cited

U.S. PATENT DOCUMENTS

| | | | |
|---|---|---|---|
| 9,032,434 B2 | 5/2015 | Lee et al. | |
| 9,431,980 B2 | 8/2016 | Popova | |
| 9,483,110 B2 | 11/2016 | Bhogal et al. | |
| 9,596,429 B2 | 3/2017 | Garcia Navarro | |
| 9,852,773 B1 * | 12/2017 | Salvador | G11B 27/22 |
| 10,063,911 B1 | 8/2018 | Obara et al. | |
| 10,084,423 B1 | 9/2018 | Goldstein et al. | |
| 10,321,204 B2 | 6/2019 | Caliendo et al. | |
| 10,341,742 B1 * | 7/2019 | Kim | H04N 21/4122 |
| 10,455,297 B1 * | 10/2019 | Mahyar | H04N 21/4532 |
| 11,558,658 B2 | 1/2023 | Channapragada et al. | |
| 2005/0025465 A1 | 2/2005 | Danieli | |

(Continued)

*Primary Examiner* — Pinkal R Chokshi
(74) *Attorney, Agent, or Firm* — Haley Guiliano LLP

(57) ABSTRACT

Systems and methods are provided herein for selectively replaying interrupted segments of media content that are important for understanding a storyline of the media content. In response to detecting noise in a media presentation environment where a current segment is being played, it is determined whether the current segment is important. Responsive to the determination that the current segment is important, a complexity score of the audio component of the current segment is determined and a replay threshold is determined based on the complexity score. Responsive to the determination that the detected noise level is greater than the replay threshold, the current segment is replayed from the beginning instead of continuing to play the media content.

20 Claims, 7 Drawing Sheets

(56) References Cited

U.S. PATENT DOCUMENTS

| | | | |
|---|---|---|---|
| 2008/0043996 A1 | 2/2008 | Dolph et al. | |
| 2014/0289241 A1 | 9/2014 | Anderson | |
| 2015/0037013 A1 | 2/2015 | Thomas et al. | |
| 2016/0014476 A1* | 1/2016 | Caliendo, Jr. | H04N 21/4396 |
| | | | 725/32 |
| 2017/0134821 A1* | 5/2017 | D'Amelio | H04N 21/42203 |
| 2017/0332125 A1 | 11/2017 | Panchaksharaiah et al. | |
| 2017/0366857 A1 | 12/2017 | Sun | |
| 2018/0270283 A1* | 9/2018 | Bostick | G06Q 10/10 |
| 2019/0372541 A1* | 12/2019 | Friant | G10L 25/78 |
| 2019/0373310 A1 | 12/2019 | Stojancic et al. | |
| 2022/0141527 A1 | 5/2022 | Channapragada et al. | |

* cited by examiner

SYSTEMS AND METHODS FOR HANDLING AUDIO DISRUPTIONS

CROSS-REFERENCE TO RELATED APPLICATION

This application is a continuation of U.S. patent application Ser. No. 17/086,743, filed Nov. 2, 2020, which is hereby incorporated by reference herein in its entirety.

BACKGROUND

The present disclosure is directed to systems and methods for selectively replaying interrupted segments of media content, and, more particularly, for selectively replaying interrupted segments of media content that are important for understanding a storyline of the media content.

SUMMARY

While a user is consuming media content (e.g., a movie), background noise (e.g., people talking, alarms, children crying) may interfere with the user's viewing experience. For example, the user may not be able to hear the audio content of the interrupted segment of the media content. In some cases, the user may rewind the media content to re-watch the segment of the media content that was interrupted by the background noise. However, if the user rewinds the media content every time background noise interrupts the media content, a significant amount of time and processing resources may be wasted.

In some cases, because it is inconvenient for the user to rewind the media content after an interruption, the user may continue watching the media content without knowing what happened in the interrupted segment. If the interrupted segment is not an important segment (e.g., it does not include important moments in a storyline of the media content) or if the interrupted segment does not include any dialogue, the user's viewing experience will not be significantly affected. If, however, the interrupted segment is an important segment (e.g., it does include important moments in a storyline of the media content) and includes important dialogue, the user's viewing experience may be negatively affected (e.g., the user may not understand a storyline of the media content).

Accordingly, to solve these problems, systems and methods are provided for selectively replaying interrupted segments of media content that are important for understanding a storyline of the media content. In particular, a media player application may play, via a computing device in a media presentation environment, media content including a plurality of media segments, each of which includes a video component and an audio component. The media player application may monitor the media presentation environment for background noise that may interrupt the audio component of the media content. In response to detecting noise while a current media segment among the plurality of media segments is playing, the media player application may determine whether the current media segment is an important media segment among the plurality of media segments. If the media player application determines that the current media segment is not an important media segment, the media player application may continue to play the media content. Otherwise, if the media player application determines that the current media segment is an important media segment, the media player application may determine a complexity score of the audio component of the current media segment (e.g., based on the amount of dialogue in the current media segment). Based on the determined complexity score, the media player application may determine a replay threshold and determine whether a level of the detected noise is greater than the determined replay threshold level. In response to determining that the level of the detected noise is greater than the determined replay threshold, the media player application may replay, via the computing device, the current media segment from the beginning instead of continuing to play the media content. This solves the problem of only replaying media segments with an important audio component (e.g., important dialogue) when media segments are interrupted by background noise.

In some embodiments, when detecting the noise in the media presentation environment, the media player application may detect noise exceeding a minimum threshold level. The minimum threshold level may be determined based on an output volume of the audio component of the current media segment.

In some embodiments, when determining whether the current media segment is an important media segment, the media player application may search metadata of the current media segment for a metadata flag indicating an important event; and in response to identifying the metadata flag indicating an important event based on a result of the searching, may determine that the current media segment is an important media segment.

In some embodiments, the media player application may determine a subtitles threshold based on the determined complexity score. The determined subtitles threshold may be greater than the determined replay threshold. In some embodiments, the media player application may determine whether the level of the detected noise is greater than the determined subtitles threshold. In response to determining that the level of the detected noise is greater than the determined subtitles threshold, the media player application may provide for display, on the computing device, subtitles corresponding to the audio component of the current media segment, while the current media segment is being replayed.

In some embodiments, the media player application may determine a volume threshold based on the determined complexity score. The determined volume threshold may be greater than the determined subtitles threshold. In some embodiments, the media player application may determine whether the level of the detected noise is greater than the determined volume threshold. In response to determining that the level of the detected noise is greater than the determined volume threshold, the media player application may increase, via the computing device, an output volume of the audio component of the current media segment, while the current media segment is being replayed.

In some embodiments, the media player application may determine the subtitles threshold further based on an output volume of the audio component of the current media segment. In some embodiments, the media player application may determine the volume threshold further based on the output volume of the audio component of the current media segment.

In some embodiments, the media player application may determine the subtitles threshold further based on a profile of the detected noise. In some embodiments, the media player application may determine the volume threshold further based on the profile of the detected noise.

In some embodiments, the media player application may determine the replay threshold level further based on an output volume of the audio component of the current media segment.

In some embodiments, the media player application may determine the replay threshold level is further based on a user profile.

In some embodiments, the media player application may determine the complexity score of the audio component of the current media segment based on an amount of dialogue in the current media segment.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
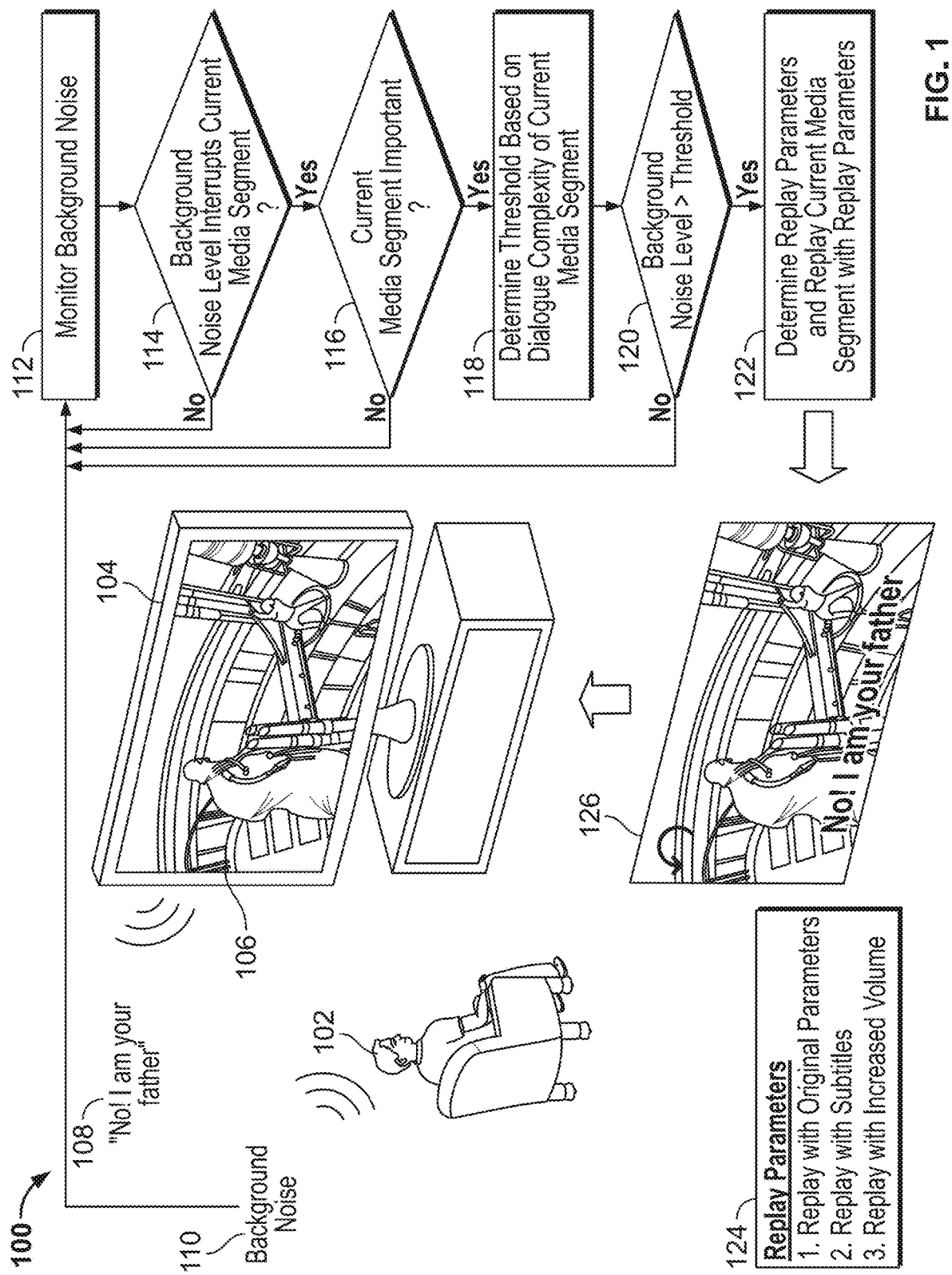
FIG. 1 shows an illustrative process for replaying a media segment that is interrupted by noise, in accordance with some embodiments of the present disclosure.

FIG. 1 shows an illustrative process for replaying a media segment that is interrupted by noise, in accordance with some embodiments of the present disclosure. As shown, a user 102 may be viewing a computing device (e.g., TV 104) that is currently playing a particular media segment 106 (i.e., the "current media segment") among a plurality of media segments comprising media content (e.g., a movie). For example, as shown, the user 102 may be watching the movie "Star Wars: Episode V." In some embodiments, each of the plurality of media segments may include a video component and an audio component. For example, as shown, while the video component of the current media segment 106 is being played, an audio component 108 (i.e., "No! I am your father") may be played through speakers of the TV 104. Although a TV is illustrated, the TV 104 may be any user equipment (e.g., a smartphone, laptop, etc.)

At 112, while "Star Wars: Episode V" is playing, a media player application, implemented on user equipment (e.g., the TV 104), may monitor the media presentation environment (e.g., a room where the user 102 is viewing the TV 104) for background noise. For example, the media player application may monitor the media presentation environment using a microphone in the TV 104 and/or microphone(s) in other user equipment (e.g., a smartphone of the user 102, a speaker connected with the TV 104, or any other user device in the media presentation environment). In some embodiments, the media player application may use filtering techniques to distinguish background noise from the audio component of "Star Wars: Episode V." As shown, the media player application may detect background noise 110 while the current media segment 106 is playing.

At 114, in response to detecting the background noise 110, the media player application may determine if detected background noise 110 interrupts the current media segment 106. For example, the media player application may determine if the background noise 110 interferes with the ability of the user 102 to hear the audio component 108. In some embodiments, the media player application may compare a level of the background noise 110 with an interruption threshold value to determine if the background noise 110 interrupts the current media segment 106. In some embodiments, the interruption threshold value may be dynamically set based on a number of factors that correspond to the ability of the user 102 to hear the audio component 108. For example, the interruption threshold value may be set based on the current volume level of the TV 104, a profile of the user 102 (e.g., is the user hard of hearing?), a number of users in the media presentation environment, a distance of the user 102 from the TV 104, etc. If the media player application determines that the background noise 110 does not interrupt the current media segment 106, the media player application may return to 112 and continue to monitor the media presentation environment. If, however, the media player application determines that the background noise 110 does interrupt the current media segment 106, the media player application may proceed to 116.

At 116, the media player application may determine if the current media segment 106 is an important media segment in "Star Wars: Episode V." For example, the media player application may determine if the current media segment 106 is an important segment for understanding a plot or storyline of "Star Wars: Episode V." In some embodiments, to do this, the media player application may access metadata of "Star Wars: Episode V" and determine if the current media segment is an important segment. For example, the media player application may search for a metadata flag indicating an important event in the current segment. In some embodiments, the metadata may include a rank of importance of different segments in "Star Wars: Episode V." If the media player application determines that the current media segment 106 is not an important media segment, the media player application may return to 112 and continue to monitor the media presentation environment. If, however, the media player application determines that the current media segment is an important media segment, the media player application may proceed to 118. As shown, the media player application determines that the current media segment 106, in which Luke Skywalker learns that Darth Vader is his father, is a very important segment in "Star Wars: Episode V" (e.g., by identifying a metadata flag indicating the importance of the event).

At 118, the media player application may determine at least one replay threshold, based on the dialogue complexity of the current media segment 106 (i.e., corresponding to the audio component 108). In some embodiments, the media player application may determine a complexity score of the audio component 108 of the current media segment 106. For example, the media player application may determine how many words are spoken during the current media segment 106. If no words are spoken during the current media segment 106, the media player application may assign a complexity score of zero. As the words spoken in the current media segment 106 increase, the media player application may assign higher complexity scores as a function of, e.g., the number of words in the segment, the number of words a minute, etc. In some embodiments, the media player application may assign complexity scores on a scale (e.g., zero to ten). However, this is only one example and the media player application may assign complexity scores on any appropriate scale that reflects the dialogue complexity of the audio component 108. As shown in more detail in FIG. 2, the media player application may determine at least one replay threshold based on the determined complexity score.

Figure 2:
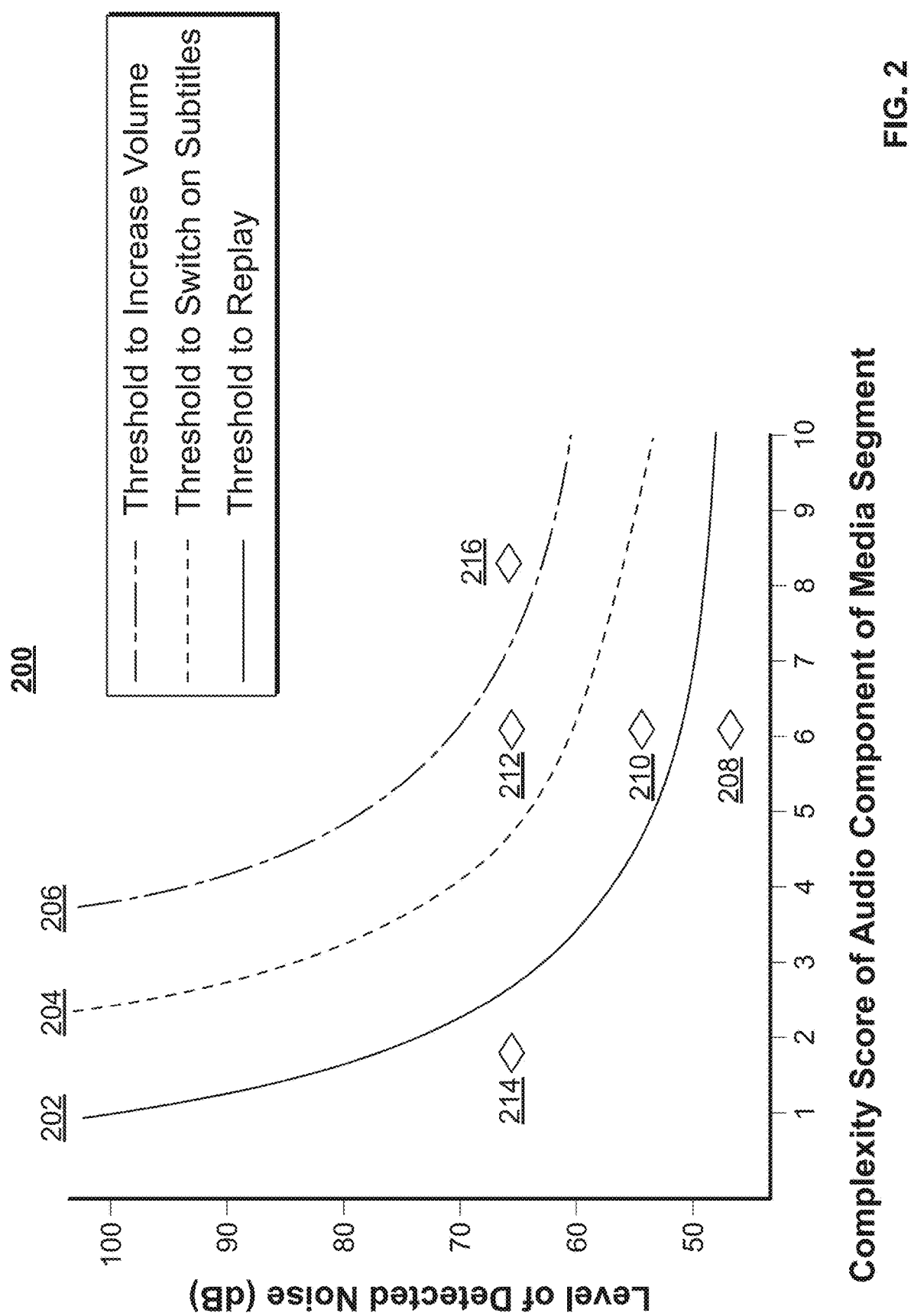
FIG. 2 shows a detailed view of an example graph including a plurality of replay thresholds, in accordance with some embodiments of the present disclosure.

FIG. 2 shows a detailed view of an example graph 200 including a plurality of replay thresholds, in accordance with some embodiments of the present disclosure. As shown, the graph 200 includes three replay thresholds 202, 204, 206, which are each a function of the complexity score of the audio component of the media segment. However, this is only one example, and the graph 200 may include more or fewer than three replay thresholds. As shown, the graph includes replay threshold 202 ("Threshold to replay"), subtitles threshold 204 ("Threshold to switch on subtitles"), and volume threshold 206 ("Threshold to increase volume"). In some embodiments, the replay thresholds 202, 204, 206 may be determined in advance (e.g., preset by the media player application). In this case, the predetermined replay thresholds 202, 204, 206 may be adjusted based on the current volume level of the TV 104 or any of the other factors described above with reference to the interruption threshold. As shown, the replay thresholds 202, 204, 206 may be plotted against the level of detected noise (e.g., decibels (dB)). In the illustrated example, the y-axis of the graph 200 is in dB and the x-axis of the graph 200 is a complexity scale from zero to ten. However, this is only an example, and the graph 200 may include any suitable axis or scales. As shown, as the complexity score of the audio component increases, each of the replay thresholds 202, 204, 206 decreases. Although the replay thresholds 202, 204, 206 are shown as non-linear relationships (i.e., with the level of detected noise), this is only one example, and the replay thresholds 202, 204, 206 may be linear. In some embodiments, the replay thresholds 202, 204, 206 may be periodically adjusted based on feedback from the user 102, as described in more detail below.

Returning to FIG. 1, at 120, the media player application may determine if the level of the background noise 110 is greater than a replay threshold. For example, the media player application may compare the level of the background noise 110 to the replay thresholds 202, 204, 206 illustrated in FIG. 2. If the media player application determines that the level of the background noise 100 is not greater than any of the replay thresholds (i.e., less than or equal to the replay threshold 202), the media player application may return to 112 and continue to monitor the media presentation environment. If, however, the media player application determines that the level of the background noise 110 is greater than at least one of the replay thresholds (i.e., greater than replay threshold 202), the media player application may proceed to 122.

At 122, the media player application may determine replay parameters for replaying the current media segment 106. For example, the media player application may determine a replay parameter, among the plurality of replay parameters 124, by comparing the level of the detected background noise 110 with the replay thresholds 202, 204, 206 illustrated in FIG. 2. For example, if the level of the detected noise is greater than the replay threshold 202 but less than the subtitles threshold 204, the media player application may replay the current media segment 106 with the original play parameters of the TV 104 when the current media segment 106 was interrupted (e.g., the same output volume and no subtitles). If the level of the detected noise is greater than the subtitles threshold 204 but less than the volume threshold 206, the media player application may replay the current media segment 106 with subtitles (but at the same output volume). If the level of the detected noise is greater than the volume threshold 206, the media player application may replay the current media segment at an increased output volume. In some embodiments, the media player application may also display subtitles when replaying the current media segment at the increased output volume.

As shown, plot points 208, 210, 212, 214, 216 are represented on the graph 200 by the level of detected noise for the complex score of the audio component of the interrupted media segment. As shown, plot points 214, 212, and 216 may have the same level of detected noise (e.g., about 65 dB) but different complexity scores, about 2, 6, and 8, while plot points 208, 210, and 212 may have the same complexly score (e.g., about 6), but different levels of detected noise (e.g., about 45 dB, 55 dB, and 65 dB). Thus, the media player application may take different actions for each corresponding interrupted segment. For example, for plot point 214, which has a low complexity score (e.g., about 2), and for plot point 208, which has a low level of detected noise (e.g., about 35 dB), the media player application may determine not to replay the interrupted segments (e.g., "No" at 120). For plot point 210, the media player application may determine to replay the interrupted segment with the original play parameters. For plot point 212, the media player application may determine to replay the interrupted segment with subtitles. For plot point 216, the media player application may determine to replay the interrupted segment at an increased volume (and with subtitles in some embodiments).

In the example shown in FIG. 1, plot point 212 may represent the level of the detected background noise 110 (e.g., about 65 dB) at the determined complexity score (e.g., about 6) of the audio component 108 for the current media segment 106. In this case, the media player application may determine the replay parameters 124 as "2. Replay with subtitles," and replay the current media segment 106 on the TV 104 with subtitles, as shown in screen 126. Examples of the screen 126 will be explained in more detail below in connection with FIGS. 3 and 4.

Figure 3:
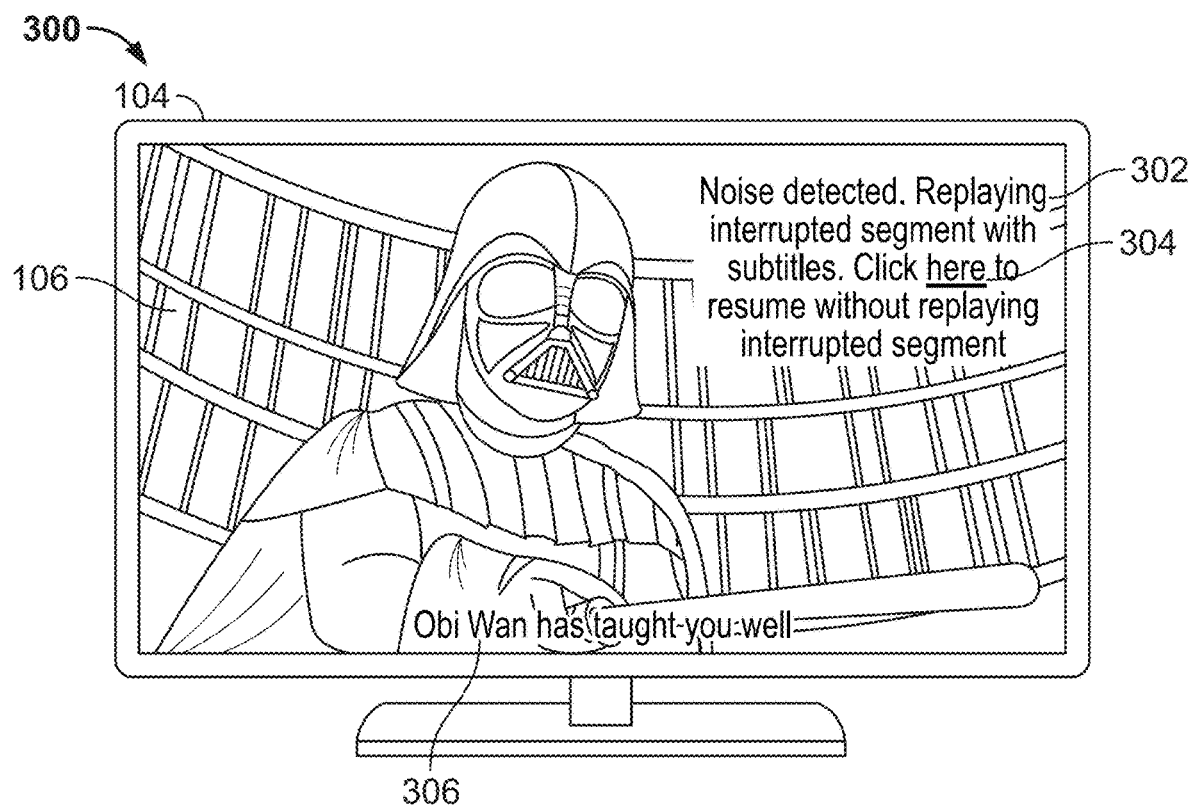
FIG. 3 provides an example screen illustrating a notification being shown while a current media segment is being replayed, in accordance with some embodiments of the present disclosure.

FIG. 3 provides an example screen 300 illustrating a notification being shown while the current media segment 106 is being replayed, in accordance with some embodiments of the present disclosure. As shown, when the current media segment 106 is interrupted, the current media segment 106 may be replayed from the beginning of the segment. As shown, when the current media segment is replayed, the media player application may display, on the TV 104, subtitles 306 of the current media segment 106 (e.g., corresponding to the audio component 108 of the current media segment 106). Additionally, the media player application may display, on the TV 104, a notification 302 informing the user 102 that the current media segment 106 is being replayed (e.g., "Noise detected. Replaying interrupted segment with subtitles"). In some embodiments, the notification 302 may include an option for the user 102 to skip replay of the current media segment 106 (e.g., "Click here to resume without replaying interrupted segment"). In some embodiments, the media player application may track how often the user 102 skips replay of an interrupted media segment or adjusts playback parameters when background noise is detected and adjust the replay thresholds (202, 204, 206) discussed above. In some embodiments, the interrupted segment may be replayed from the point when background noise was detected. In some embodiments, the interrupted segment may be replayed from a point a predetermined time before the point when background noise was detected. In some embodiments, the interrupted segment may be replayed from the beginning of the scene in which the background noise was detected. In some embodiments, replay points may be set by the user 102.

Figure 4:
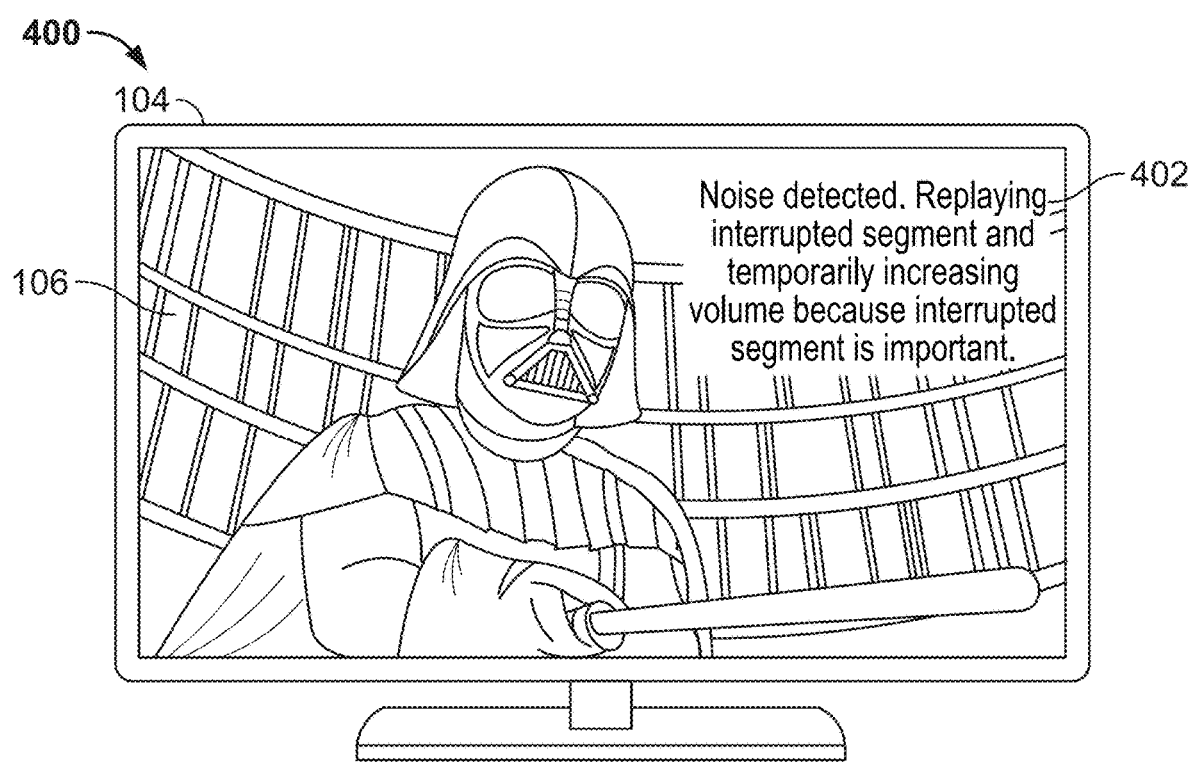
FIG. 4 provides an example screen illustrating a notification being shown while a current media segment is being replayed, in accordance with some embodiments of the present disclosure.

FIG. 4 provides an example screen 400 illustrating a notification being shown while the current media segment 106 is being replayed, in accordance with some embodiments of the present disclosure. As shown, the screen 400 may be displayed when the media player application determines to replay the current media segment 106 with an increased volume. As shown, when the current media segment 106 is replayed at an increased volume, the media player application may display, on the TV 104, a notification 402 informing the user 102 why the current media segment 106 is being replayed (e.g., "Noise detected. Replaying interrupted segment and temporarily increasing volume because interrupted segment is important").

Figure 5:
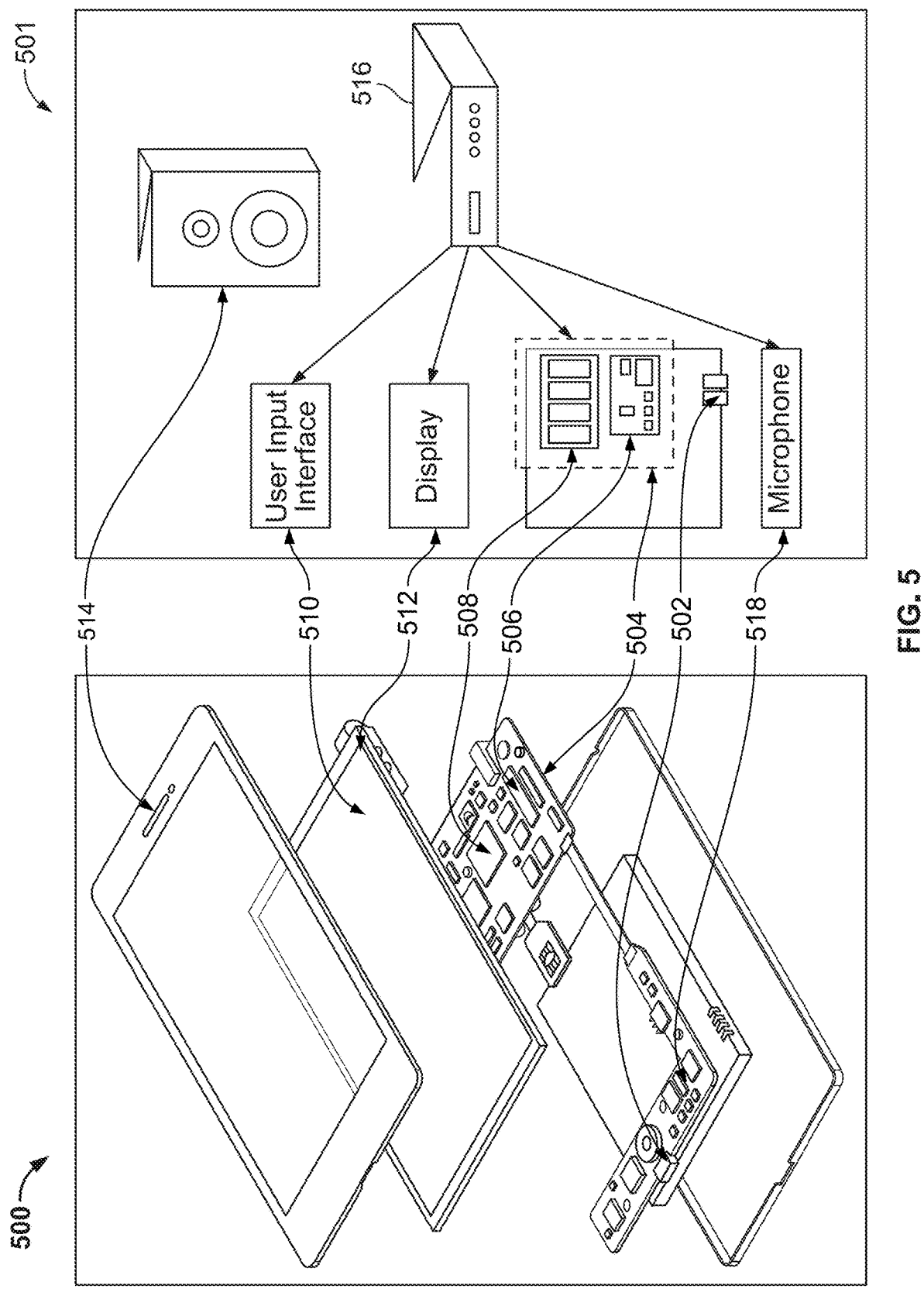
FIGS. 5-6 describe exemplary devices, systems, servers, and related hardware for replaying a media segment that is interrupted by noise, in accordance with some embodiments of the present disclosure.
Figure 6:
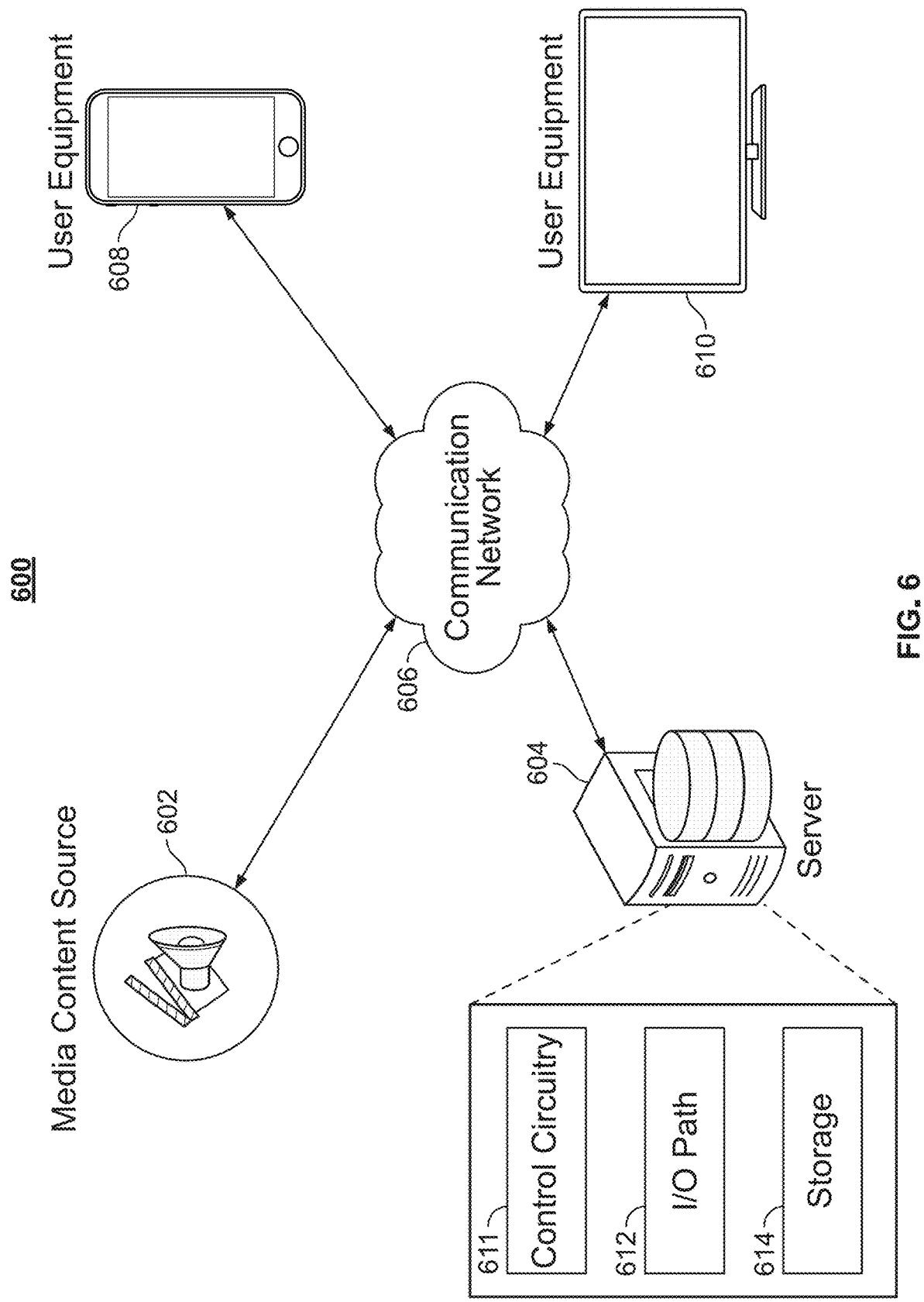

FIGS. 5-6 describe exemplary devices, systems, servers, and related hardware for replaying a media segment that is interrupted by noise, in accordance with some embodiments of the present disclosure. FIG. 5 shows generalized embodiments of illustrative user equipment devices 500 and 501. For example, user equipment device 500 may be a smartphone device. In another example, user equipment system 501 may be a user television equipment system (e.g., the TV 104). The user television equipment system 501 may include a set-top box 516. The set-top box 516 may be communicatively connected to a microphone 518, a speaker 514, and a display 512. In some embodiments, the microphone 518 may detect sound (e.g., background noise) in the media presentation environment. In some embodiments, the display 512 may be a television display or a computer display. In some embodiments, the set-top box 516 may be communicatively connected to a user input interface 510. In some embodiments, the user input interface 510 may be a remote control device. The set-top box 516 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of user equipment devices are discussed below in connection with FIG. 6. Each one of the user equipment device 500 and the user equipment system 501 may receive content and data via input/output ("I/O") path 502. The I/O path 502 may provide content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths (described below). I/O functions may be provided by one or more of these communications paths, but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 504 executes instructions for a media player application stored in memory (i.e., the storage 508). Specifically, the control circuitry 504 may be instructed by the media player application to perform the functions discussed above and below. In some implementations, any action performed by the control circuitry 504 may be based on instructions received from the media player application.

In client/server-based embodiments, the control circuitry 504 may include communications circuitry suitable for communicating with a media player application server or other networks or servers. The instructions for carrying out the above mentioned functionality may be stored on a server (which is described in more detail in connection with FIG. 6. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The storage 508 may be used to store various types of content described herein as well as media player application data described above. Nonvolatile memory may also be used (e.g., to launch a boot-up routine and other instructions). Cloud-based storage, described in relation to FIG. 6, may be used to supplement the storage 508 or instead of the storage 508.

The control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. The control circuitry 504 may also include scaler circuitry for upconverting and downconverting content into the preferred output format of the user equipment 500. The circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If the storage 508 is provided as a separate device from the user equipment device 500, the tuning and encoding circuitry (including multiple tuners) may be associated with the storage 508.

A user may send instructions to the control circuitry 504 using the user input interface 510. The user input interface 510 may be any suitable user interface, such as a remote control, mouse, trackball, keypad, keyboard, touch screen, touchpad, stylus input, joystick, voice recognition interface, or other user input interfaces. The display 512 may be provided as a stand-alone device or integrated with other elements of each one of the user equipment device 500 and the user equipment system 501. For example, the display 512 may be a touchscreen or touch-sensitive display. In such circumstances, the user input interface 510 may be integrated with or combined with display 512. The display 512 may be one or more of a monitor, a television, a display for a mobile device, or any other type of display. A video card or graphics card may generate the output to the display 512. The video card may be any processing circuitry described above in relation to the control circuitry 504. The video card may be integrated with the control circuitry 504. Speakers 514 may be provided as integrated with other elements of each one of the user equipment device 500 and the user equipment system 501 or may be stand-alone units. The audio component of videos and other content displayed on the display 512 may be played through the speakers 514. In some embodiments, the audio may be distributed to a receiver (not shown), which processes and outputs the audio via speakers 514.

The media player application may be implemented using any suitable architecture. For example, it may be a stand-alone application wholly-implemented on each one of the user equipment device 500 and the user equipment system 501. In such an approach, instructions of the application are stored locally (e.g., in the storage 508), and data for use by the application is downloaded on a periodic basis (e.g., from an out-of-band feed, from an Internet resource, or using another suitable approach). The control circuitry 504 may retrieve instructions of the application from the storage 508 and process the instructions to rearrange the segments as discussed. Based on the processed instructions, the control circuitry 504 may determine what action to perform when input is received from the user input interface 510. For example, movement of a cursor on a display up/down may be indicated by the processed instructions when the user input interface 510 indicates that an up/down button was selected.

In some embodiments, the media player application is a client/server-based application. Data for use by a thick or thin client implemented on each one of the user equipment device 500 and the user equipment system 501 is retrieved on-demand by issuing requests to a server remote to each one of the user equipment device 500 and the user equipment system 501. In one example of a client/server-based guidance application, the control circuitry 504 runs a web browser that interprets web pages provided by a remote server. For example, the remote server may store the instructions for the application in a storage device. The remote server may process the stored instructions using circuitry (e.g., the control circuitry 504) and to selectively replay interrupted segments of media content that are important for understanding a storyline of the media content as discussed.

In some embodiments, the media player application is downloaded and interpreted or otherwise run by an interpreter or virtual machine (run by the control circuitry 504). In some embodiments, the media player application may be encoded in the ETV Binary Interchange Format (EBIF), received by the control circuitry 504 as part of a suitable feed, and interpreted by a user agent running on the control circuitry 504. For example, the media player application may be an EBIF application. In some embodiments, the media player application may be defined by a series of JAVA-based files that are received and run by a local virtual machine or other suitable middleware executed by control circuitry 504. In some of such embodiments (e.g., those employing MPEG-2 or other digital media encoding schemes), the media player application may be, for example, encoded and transmitted in an MPEG-2 object carousel with the MPEG audio and video packets of a program.

FIG. 6 is a diagram of an illustrative media system, in accordance with some embodiments of the disclosure. User equipment devices 608 and 610 (such as the TV 104) may be coupled to communication network 606. The communication network 606 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 6 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via the communication network 606.

The system 600 includes a media content source 602 and a server 604. Communications with the media content source 602 and the server 604 may be exchanged over one or more communications paths but are shown as a single path in FIG. 6 to avoid overcomplicating the drawing. In addition, there may be more than one of each of the media content source 602 and the server 604, but only one of each is shown in FIG. 6 to avoid overcomplicating the drawing.

If desired, the media content source 602 and the server 604 may be integrated as one source device.

In some embodiments, the server 604 may include control circuitry 611 and a storage 614 (e.g., RAM, ROM, Hard Disk, Removable Disk, etc.). The server 604 may also include an input/output path 612. The I/O path 612 may provide device information, or other data, over a local area network (LAN) or wide area network (WAN), and/or other content and data to the control circuitry 611, which includes processing circuitry, and the storage 614. The control circuitry 611 may be used to send and receive commands, requests, and other suitable data using the I/O path 612. The I/O path 612 may connect the control circuitry 304 (and specifically processing circuitry) to one or more communications paths.

The control circuitry 611 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 611 executes instructions for an emulation system application stored in memory (e.g., the storage 614). Memory may be an electronic storage device provided as the storage 614 that is part of the control circuitry 611.

The server 604 may retrieve guidance data from media content source 602, process the data as will be described in detail below, and forward the data to the user equipment devices 608 and 610. The media content source 602 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 602 may be the originator of content (e.g., a television broadcaster, a Webcast provider, etc.) or may not be the originator of content (e.g., an on-demand content provider, an Internet provider of content of broadcast programs for downloading, etc.). The media content source 602 may include cable sources, satellite providers, on-demand providers, Internet providers, over-the-top content providers, or other providers of content. The media content source 602 may also include a remote media server used to store different types of content (including video content selected by a user), in a location remote from any of the client devices. The media content source 602 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 604), which may be located centrally or at distributed locations, that provide cloud-based services to various types of users and devices connected via a network such as the Internet via communication network 606. In such embodiments, user equipment devices may operate in a peer-to-peer manner without communicating with a central server.

Figure 7:
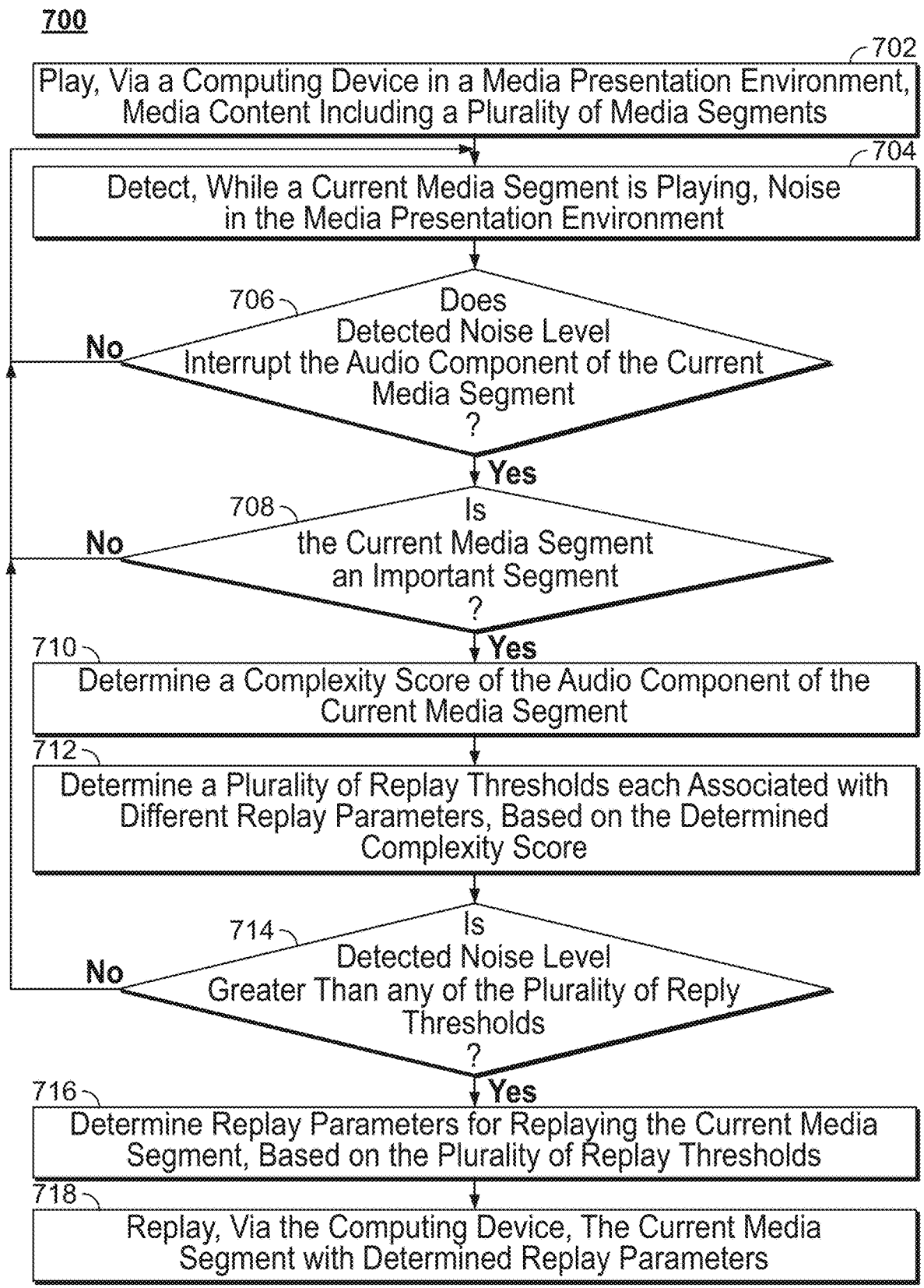
FIG. 7 depicts a flowchart of illustrative steps for replaying a media segment that is interrupted by noise, in accordance with some embodiments of the present disclosure.

FIG. 7 depicts a flowchart of illustrative steps for replaying a media segment that is interrupted by noise, in accordance with some embodiments of the present disclosure. The process 700 may be executed by the control circuitry 504 (e.g., in a manner instructed to the control circuitry 504 by the media player application). The control circuitry 504 may be part of user equipment (e.g., a device that may have any or all of the functionality of the user equipment devices 608 or 610), or of a remote server separated from the user equipment by way of the communication network 606, or distributed over a combination of both. It should be noted that the process 700, or any step thereof, could be performed on, or provided by, any of the devices shown in FIGS. 1, 3-4, and 5-6.

The process 700 begins at step 702, when the media player application (e.g., via the control circuitry 504) plays, via a computing device (e.g., the user equipment device 500 or the user television equipment system 501) in a media presentation environment, media content (e.g., a movie) including a plurality of media segments.

At step 704, the media player application (e.g., via the control circuitry 504), detects, while a current media segment of the media content is playing, noise in the media presentation environment (e.g., background noise). For example, the control circuitry 504 may process signals from the microphone 518 to detect noise in the media presentation environment.

At step 706, the media player application (e.g., via the control circuitry 504), determines if the detected noise level interrupts the audio component of the current media segment. For example, the media player application may determine if the level of the detected noise is likely to interfere with a user's ability to hear the audio component of the current media segment. In one example, the media player application may make this determination in part based on the output volume of the computing device. If the control circuitry 504 determines that the detected noise level does not interrupt the audio component of the current media segment (e.g., "No" at 706), the process 700 may return back to step 704 and continue to monitor the media presentation environment (while continuing to play the media content). Otherwise, if the control circuitry 504 determines that the detected noise level does interrupt the audio component of the current media segment (e.g., "Yes" at 706), the process 700 may proceed to step 708.

At step 708, the media player application (e.g., via the control circuitry 504), determines if the current media segment is an important segment. For example, the control circuitry 504 may retrieve metadata of the current media segment and determine if the metadata includes a metadata flag indicating an important event (e.g., important for understanding a plot or storyline of the media content). If the control circuitry 504 determines that the current media segment is not an important segment ("No" at 708), the process 700 may return back to step 704 and continue to monitor the media presentation environment (while continuing to play the media content). Otherwise, if the control circuitry 504 determines that the current media segment is an important segment ("Yes" at 708), the process may proceed to step 710.

At step 710, the media player application (e.g., via the control circuitry 504), determines a complexity score of the audio component of the current media segment. For example, the control circuitry 504 may determine the complexity score based on the dialogue complexity of the audio component of the current media segment (e.g., the number of spoken words in the audio component of the current media segment). As one example, the control circuitry 504 may determine a high complexity score for a segment having a large amount of dialogue and determine a low complexity score for a segment having a small amount of dialogue.

At step 712, the media player application (e.g., via the control circuitry 504), determines a plurality of replay thresholds, each associated with different replay parameters, based on the determined complexity score. For example, each of the plurality of replay thresholds may be a function of the determined complexity score.

At step 714, the media player application (e.g., via the control circuitry 504), determines if the detected noise level is greater than any of the plurality of replay thresholds. For example, the control circuitry 504 may determine if the detected noise level is greater than the lowest replay threshold of the plurality of replay thresholds. If the control circuitry 504 determines that the detected noise level is not greater than any of the plurality of replay thresholds ("No" at 714), the process 700 may return back to step 704 and continue to monitor the media presentation environment (while continuing to play the media content). Otherwise, if the control circuitry 504 determines that the detected noise level is greater than at least one of the plurality of replay thresholds ("Yes" at 714), the process may proceed to step 716.

At step 716, the media player application (e.g., via the control circuitry 504), determines replay parameters for replaying the current media segment, based on the plurality of replay thresholds. For example, as described in more detail in connection with FIG. 8, each of the plurality of replay thresholds may be associated with different replay parameters.

At step 718, the media player application (e.g., via the control circuitry 504), replays, via a computing device (e.g., the user equipment device 500 or the user television equipment system 501), the current media segment with the determined replay parameters. For example, the control circuitry 504 restarts the interrupted segment so that a user can understand the audio component of the interrupted segment.

Figure 8:
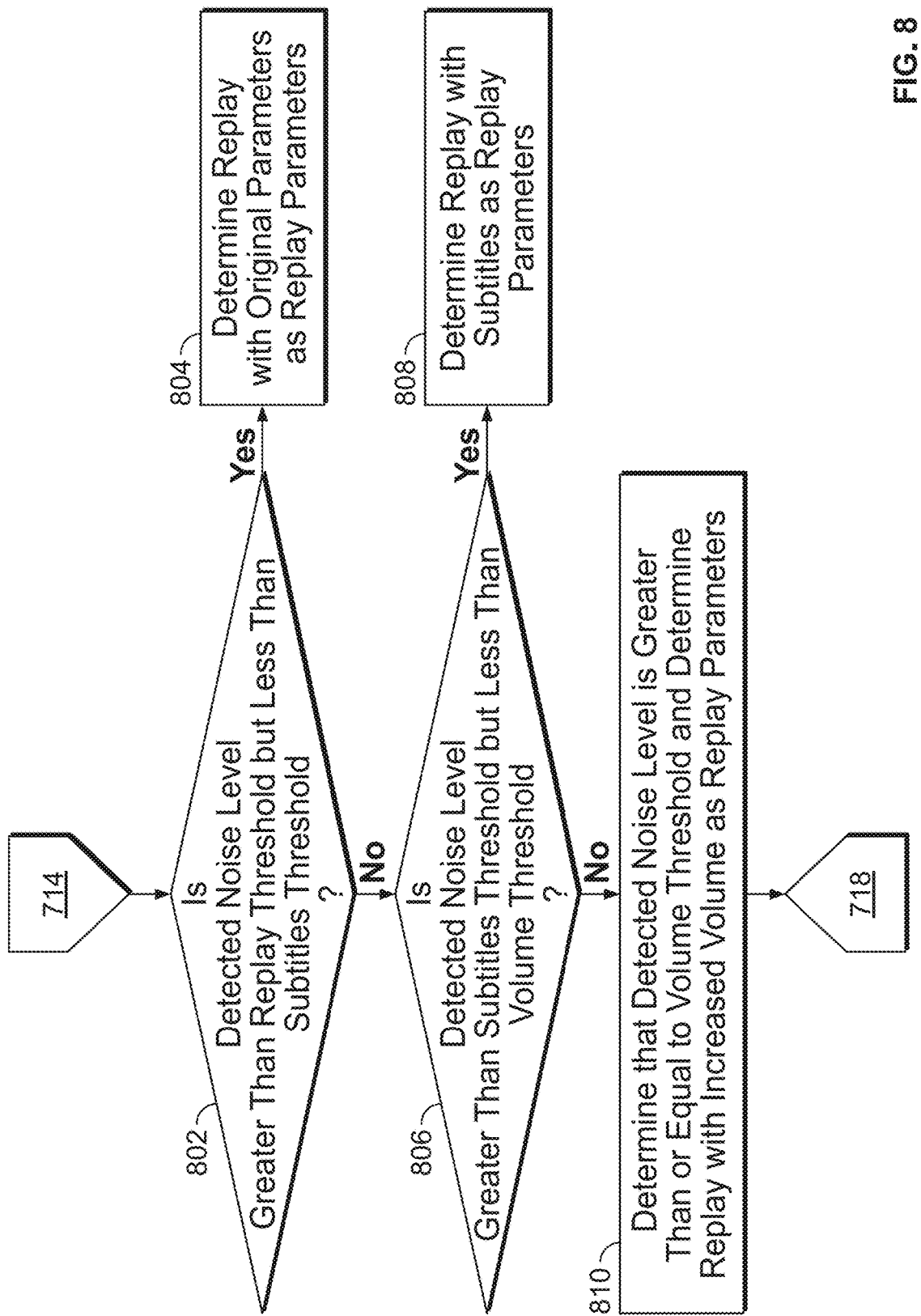
FIG. 8 depicts a flowchart of illustrative steps for determining replay parameters for replaying a current media segment, in accordance with some embodiments of the present disclosure.

FIG. 8 depicts a flowchart of illustrative steps for determining replay parameters for replaying a current media segment, in accordance with some embodiments of the present disclosure. Process 716A is one embodiment of a method for performing step 716 of FIG. 7 and begins after step 714. At step 802, the media player application (e.g., via the control circuitry 504), determines if the detected noise level is greater than a replay threshold but less than a subtitles threshold. If the control circuitry 504 determines that the detected noise level is greater than the replay threshold but less than the subtitles threshold ("Yes" at 802), the process 716A may proceed to step 804 and determine "replay with original parameters" as the replay parameters. Otherwise, if the control circuitry 504 determines that the detected noise level is greater than the replay threshold but not less than the subtitles threshold ("No" at 802), the process may proceed to step 806.

At step 806, the media player application (e.g., via the control circuitry 504), determines if the detected noise level is greater than the subtitles threshold but less than a volume threshold. If the control circuitry 504 determines that the detected noise level is greater than the subtitles threshold but less than the volume threshold ("Yes" at 806), the process 716A may proceed to step 808 and determine "replay with subtitles" as the replay parameters. Otherwise, if the control circuitry 504 determines that the detected noise level is greater than the subtitles threshold but not less than the volume threshold ("No" at 806), the process may proceed to step 810.

At step 810, the media player application (e.g., via the control circuitry 504), determines that the detected noise level is greater than or equal to the volume threshold and determines "reply with increased volume" as the replay parameters. The process 716A then continues with step 716, in which the media player application replays the current media segment with the determined replay parameters.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   determining a level of noise present in a media presentation environment during playing of a first portion of a content item, the first portion comprising an audio component;
   determining that the first portion is an important portion of the content item;
   in response to determining that the first portion is an important portion:
   determining a complexity score of the audio component;
   determining a replay threshold based on the complexity score, wherein the replay threshold corresponds to a first noise level; and
   determining a subtitles threshold based on the complexity score, wherein the subtitles threshold corresponds to a second noise level, wherein the second noise level corresponding to the subtitles threshold is a second non-zero value that exceeds a first non-zero value of the first noise level corresponding to the replay threshold;
   in response to determining that the level of noise present in the media presentation environment exceeds the replay threshold corresponding to the first noise level but does not exceed the subtitles threshold corresponding to the second noise level:

causing replay of the first portion from the beginning of the first portion instead of continuing to play the content item, without causing display of subtitles corresponding to the audio component; and in response to determining that the level of the noise present in the media presentation environment exceeds each of the replay threshold corresponding to the first noise level and the subtitles threshold corresponding to the second noise level;

causing simultaneous (i) replay of the first portion from the beginning of the first portion instead of continuing to play the content item and (ii) display of the subtitles corresponding to the audio component.

2. The method of claim 1, wherein the first portion comprises a video component.

3. The method of claim 1, wherein the determining the level of noise present in the media presentation environment comprises identifying noise exceeding a minimum threshold level, wherein the minimum threshold level is determined based on an output volume of the audio component.

4. The method of claim 1, wherein the determining that the first portion is an important portion of the content item comprises:
searching metadata of the first portion for a metadata flag indicating occurrence of an important event; and
in response to identifying the metadata flag indicating the occurrence of the important event based on the searching the metadata, determining that the first portion is an important portion.

5. The method of claim 1, further comprising:
determining a volume threshold based on the complexity score, wherein the volume threshold corresponds to a third noise level that is greater than the second noise level corresponding to the subtitles threshold;
determining whether the level of the noise is greater than the volume threshold; and
in response to determining that the level of the noise is greater than the volume threshold, increasing an output volume of the audio component during replaying of the first portion.

6. The method of claim 5, wherein:
the subtitles threshold is further determined based on the output volume of the audio component; and
the volume threshold is further determined based on the output volume of the audio component.

7. The method of claim 6, wherein:
the subtitles threshold is further determined based on a profile of the noise; and
the volume threshold is further determined based on the profile of the noise.

8. The method of claim 1, wherein the replay threshold is further determined based on an output volume of the audio component.

9. The method of claim 8, wherein the replay threshold is further determined based on a user profile.

10. The method of claim 1, wherein the complexity score of the audio component is determined further based on an amount of dialogue in the first portion.

11. A system comprising:
audio input/output (I/O) circuitry configured to output audio content; and
control circuitry configured to:
determine a level of noise present in a media presentation environment during playing of a first portion of a content item, the first portion comprising an audio component;
determine that the first portion is an important portion of the content item;
in response to determining that the first portion is an important portion:
determine a complexity score of the audio component;
determine a replay threshold based on the complexity score, wherein the replay threshold corresponds to a first noise level; and
determine a subtitles threshold based on the complexity score, wherein the subtitles threshold corresponds to a second noise level, wherein the second noise level corresponding to the subtitles threshold is a second non-zero value that exceeds a first non-zero value of the first noise level corresponding to the replay threshold;
in response to determining that the level of noise present in the media presentation environment exceeds the replay threshold corresponding to the first noise level but does not exceed the subtitles threshold corresponding to the second noise level:
cause replay, via the audio I/O circuitry, of the first portion from the beginning of the first portion instead of continuing to play the content item, without causing display of subtitles corresponding to the audio component; and
in response to determining the level of the noise present in the media presentation environment exceeds each of the replay threshold corresponding to the first noise level and the subtitles threshold corresponding to the second noise level;
cause simultaneous (i) replay of the first portion from the beginning of the first portion instead of continuing to play the content item and (ii) display of the subtitles corresponding to the audio component.

12. The system of claim 11, wherein the first portion comprises a video component.

13. The system of claim 11, wherein the control circuitry, when determining the level of noise present in the media presentation environment, is configured to identify noise exceeding a minimum threshold level, and wherein the control circuitry is configured to determine the minimum threshold level based on an output volume of the audio component.

14. The system of claim 11, wherein the control circuitry, when determining that the first portion is an important portion of the content item, is configured to:
search metadata of the first portion for a metadata flag indicating an occurrence of an important event; and
in response to identifying the metadata flag indicate the occurrence of the important event based on the searching the metadata, determine that the first portion is an important portion.

15. The system of claim 11, wherein the control circuitry is further configured to:
determine a volume threshold based on the complexity score, wherein the volume threshold corresponds to a third noise level that is greater than the second noise level corresponding to the subtitles threshold;
determine whether the level of the noise is greater than the volume threshold; and
in response to determining that the level of the noise is greater than the volume threshold, increase an output volume of the audio component during replaying of the first portion.

16. The system of claim 15, wherein the control circuitry is further configured to:
   determine the subtitles threshold further based on the output volume of the audio component; and
   determine the volume threshold further based on the output volume of the audio component.

17. The system of claim 16, wherein the control circuitry is further configured to:
   determine the subtitles threshold further based on a profile of the noise; and
   determine the volume threshold further based on the profile of the noise.

18. The system of claim 11, wherein the control circuitry is further configured to determine the replay threshold further based on an output volume of the audio component.

19. The system of claim 18, wherein the control circuitry is further configured to determine the replay threshold further based on a user profile.

20. The system of claim 11, wherein the control circuitry is configured to determine the complexity score of the audio component further based on an amount of dialogue in the first portion.

* * * * *